United States Patent [19]
Dodd

[11] Patent Number: 4,553,776
[45] Date of Patent: Nov. 19, 1985

[54] TUBING CONNECTOR

[75] Inventor: Paul L. Dodd, Metairie, La.

[73] Assignee: Shell Oil Company, Houston, Tex.

[21] Appl. No.: 545,304

[22] Filed: Oct. 25, 1983

[51] Int. Cl.[4] .................................................. F16L 5/00
[52] U.S. Cl. ...................................... 285/212; 285/220;
   285/351; 285/356; 285/382.7
[58] Field of Search ............... 285/356, 351, 212, 220,
   285/332, 382.7

[56] References Cited

U.S. PATENT DOCUMENTS

| 2,211,122 | 8/1940 | Howard | 285/351 |
| 3,362,731 | 1/1968 | Gasche et al. | 285/212 |
| 3,510,155 | 5/1970 | Jacobus | 285/351 |

FOREIGN PATENT DOCUMENTS 0839143  5/1952  Fed. Rep. of Germany ...... 285/351

Primary Examiner—Cornelius J. Husar
Assistant Examiner—Eric K. Nicholson

[57] ABSTRACT

A small-diameter tubing connector and sealing apparatus for anchoring a tubing end in fluidtight engagement in high pressure service (up to 60,000 psi), said apparatus having four separate sealing areas.

11 Claims, 1 Drawing Figure

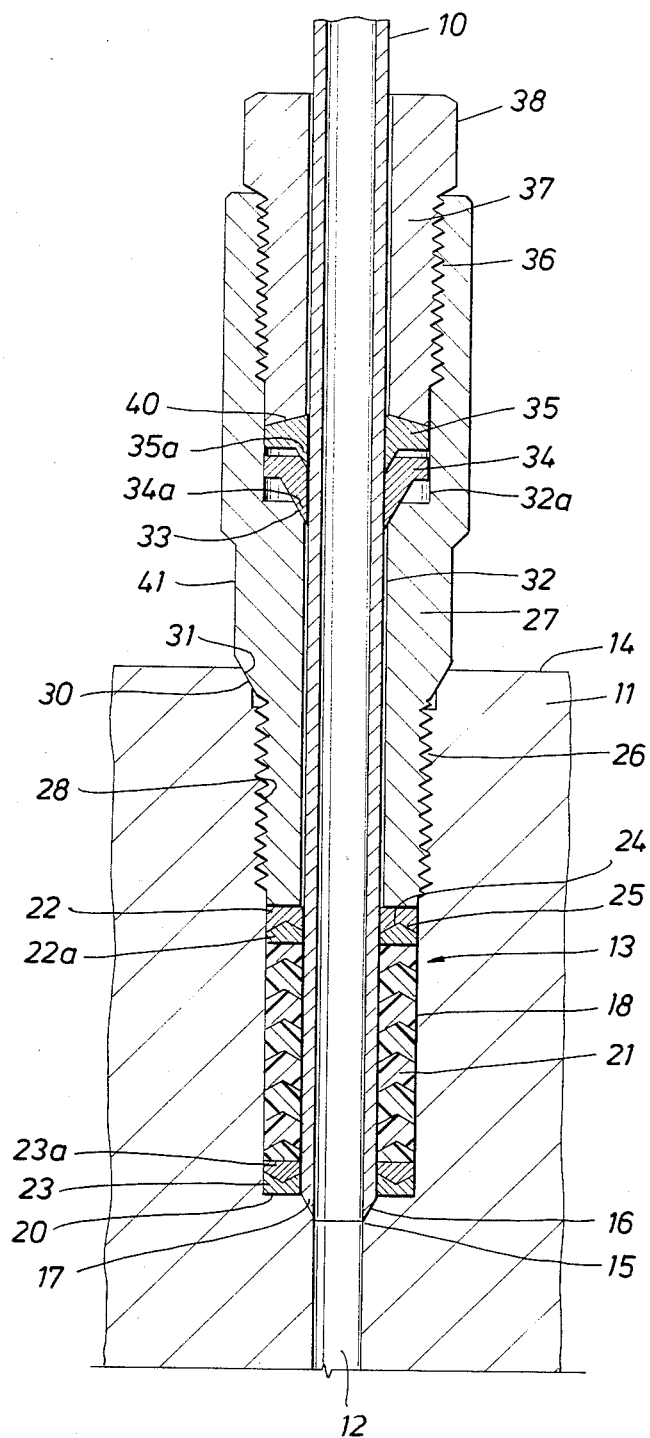

TUBING CONNECTOR

BACKGROUND OF THE INVENTION

This invention relates to an apparatus for connecting a small diameter tubing to a conduit in another piece of apparatus that is in communication with or handles pressure fluid in high pressure service, say, up to 60,000 lb. per square inch pressure.

There are many instances in industry where it is necessary to employ a small diameter tubing to handle a gas or liquid under high pressure. Since in many instances the gas or fluid may be corrosive in nature and the tubing is placed in inaccessable location, i.e., in a well annulus, it is desirable to employ tubing fittings that will withstand many years of usage without failure.

Tubing fittings in accordance with the present invention are employed, for example, in high pressure offshore oil and gas wells where the pressure may range from 10 to 30,000 pounds per square inch. Since it is often very difficult and extremely expensive to replace failed fittings in a high pressure well or in its wellhead assembly, it is desirable to provide tubing connectors for the well that will last the expected life of the well, say, 20 years. In the event of failure of one sealing surface or sealing area, it is desirable to have a backup or auxiliary sealing area on a tubing connector fitting which by itself can positively seal a tubing to a piece of equipment used in high pressure service.

SUMMARY OF THE INVENTION

It is an object of the present invention to provide a small diameter tubing connector and sealing apparatus for anchoring a small diameter tubing in fluidtight flow communication with a source of high pressure fluid. The tubing connector and sealing apparatus of the present invention is provided with multiple sealing areas between a tubing and the equipment to which it is connected. Some of the seals may be of the metal-to-metal type while at least one of the seals is made up at least partially of nonmetallic material which may be compressible and expandable. The tubing connector and sealing apparatus described herein is also provided with means for actuating or energizing the cooperating elements forming the sealing areas of the present apparatus.

BRIEF DESCRIPTION OF THE DRAWING

The tubing connector and sealing apparatus of the present invention is described with regard to the drawing which is a longitudinal view, taken in cross-section through the connector, the tubing and a portion of the body to which the tubing is connected.

DESCRIPTION OF A PREFERRED EMBODIMENT

Referring to the drawing, a small diameter tubing 10, for example, a quarter-inch tubing, is shown as being connected in a fluidtight manner with a body element 11 which has a flow passageway 12 therein for handling high pressure, hydraulic or pneumatic service. The body element 11 may be part of a subsurface safety valve assembly at the top of an oil or gas well or may be a portion of a tubing hanger used in a wellhead assembly in a manner well known to the art. The body element 11 is provided with a precisely machined recess 13 which extends from one surface thereof with the lower end of the recess terminating at a point 15 in communication with the flow passageway 12. The diameter of the flow Passageway 12 is substantially equal to the inner diameter of the tubing 10 to be connected to the body element 11.

When viewed in longitudinal cross section with the axis of the recess 13 being vertical as shown in the drawing, from the bottom to the top the recess takes the form of a first seating shoulder 16 having an outwardly-sloping seating surface flaring upwardly and outwardly from the flow passage 12, meeting at point 15 in the body element 11. This first seating shoulder 16 is adapted to receive the end of the small-diameter tubing 10 which is preferably provided with a seating surface which is tapered or beveled to the same angle as the shoulder 16.

The portion of the recess 13 directly above the first seating shoulder 16 is formed at a larger diameter, at least twice the diameter of the tubing 10, and forms a smooth-walled section 18 above the preferably flat bottom 20 of the recess, for a distance sufficient to hold a plurality of packing rings 21 which are of a nonmetallic composition. The packing rings 21 may be of any suitable composition which will withstand the fluids to which they may become exposed. The rings 21 may, for example, be rings of the chevron type or of any other suitable packing design well known to the art. The top and bottom rings of packing 22, 22a, 23, and 23a, respectively, are preferably made of a soft metal such as brass or soft Monel. The metal packing rings 22 and 22a are preferably formed in a manner such that a V-groove 24 is formed on the bottom face of packing ring 22 while the top surface of packing ring 22a has sloping shoulders 25. The angle at which the sloping shoulders 25 are formed on the top of packing ring 22a is preferably greater than the angle at which the groove 24 is cut in the lower face of packing ring 22. For example, the sloping shoulders 25 may be cut at a 120° angle while the V-groove 24 is cut at a 110° angle. Thus, when the packing rings 22 and 22a are compressed against each other, the lower ring 22a will force the lower edges of the metal ring 22 outwardly against the tubing 10 and the inner-wall of the recess 13. Such an arrangement of the packing rings 22 and 22a acts to provide an anti-extrusion ring to keep the nonmetallic packing rings from being squeezed out along the tubing 10. A threaded section 26 is formed in the wall of the recess above the smooth-walled section 18 which contains the packing rings. A packing gland 27 has its lower end threaded, as at 28, to fit within the threaded end of the recess 18. A shoulder 30 is formed in the body element at the upper end of the recess just above the threaded wall section 26 thereof.

A first seal or sealing area is formed when the beveled lower end of the tubing 10 is seated on the shoulder 16 at the bottom of the recess 13. The packing rings 21, 22, and 23 surrounding the tubing 10 in the smooth-walled section of the recess form a second seal between the outer wall of the tubing and the smooth-walled section of the recess. The packing gland 27 is an elongated tubular member forming in essence the connector body of the present tubular coupling. The lower end of the packing gland 27 is reduced in diameter and is threaded on the outer surface thereof to mate with the threaded section 26 of the recess. An outwardly and upwardly sloping shoulder 31 is formed on the gland 27 above the threaded section thereof, said shoulder being formed at an angle to mate with the seating shoulder 30 on the body element 11. When the shoulders 30 and 31 have been pulled against each other by the threads 26 and 28, a tertiary seal is formed at the top of the recess 13.

A bore 32 extends axially through the packing gland 27 with the lower portion of the bore having a diameter slightly greater than the outer diameter of the tubing 10 to be inserted therethrough. The upper end of the bore 32 of said packing gland 27 is formed with an enlarged diameter, as at 32a, to form a ferrule containing section. A ferrule seating shoulder 33 is formed at the bottom of the enlarged ferrule containing section 32a. One or more ferrules 34 and 35 may be positioned in said ferrule chamber 32a around the tubing 10.

The inner wall of the packing gland 27 above the ferrules 34 and 35 is threaded, as at 36, to receive a ferrule energizer nut 37 which is threaded in a manner to cooperate with threads 36. The outer surface of the top of the nut 37 is provided with a wrench flats 38 so that a wrench may be used to tighten the nut 37 down into the packing gland 27 and into contact with the top of the ferrule 35. The lower end of the ferrule energized nut 37 is preferably concave, as at 40, so as to force the outer edges of the ferrules downwardly so that the inner edges 35a and 34a of the ferrules 35 and 34 bite into or frictionally engage the outer surface of the tubing 10 at that point to form a fluidtight seal around the tubing. At the same time, the Lip 34a of ferrule 34 forms a fluidtight seal between the ferrule and the inner surface of the bore 33. With the ferrules 34 and 35 biting into the outer surface of the tubing 10, continued threading of the nut 37 into the top of the packing gland 27 causes the tubing 10 to be urged downwardly so that the tapered lower end 17 thereof seats in fluidtight engagement with the shoulder 16 at the bottom of the recess 13. Since the use and construction of ferrules 34 and 35 are well known to the art and their particular form and construction does not constitute part of this invention, they will not be further described here.

Thus, it may be seen that the threaded section 28 on the packing gland 27 forms a first actuating means when in cooperation with the threads 26 in the body element 11, for operatively contacting and energizing first the rings of packing 21, 22, and 23 within the smoothwalled section 18 of the recess, and subsequently completing the seal between the shoulders 30 and 31 when the packing gland is pulled tightly by the threads into the body element 11. The packing gland 27 is provided with wrench flats 41 in order to pull the packing gland 27 tightly within the body element 11. The wrench flats 41 are preferably formed on the outer surface of the packing gland 27 below the ferrule area so that the thinner-walled section of the packing gland next to the ferrules 34 and 35 will not become deformed in a manner to prevent adequate sealing by the ferrules.

It may be seen that a tubing connector and sealing apparatus of the above construction provides a first sealing area between the tubing 10 and the body element 11 at the shoulders 17 and 16. A second sealing area between the tubing 10 and body element is formed by the rings of packing 21 positioned just above the shoulders 16 and 17. A third sealing surface is formed by the shoulder 31 of the gland 27 seating on the cooperating shoulder 30 and the body element 11. A fourth sealing area is formed by the inner and outer walls of the ferrules 34 and 35 seating against the outer surface of the tubing 10 and the inner wall of the ferrule bore 32 as well as against the shoulder 33 of the gland 27.

Thus the threaded gland 27 acts as a first actuating means, the lower end of which operatively engages the upper packing ring 22 to actuate the sealing rings until the shoulder 31 of the gland 27 seats on shoulder 30 of the body element to seal the apparatus at this point. The threaded ferrule energizer nut 38 acts as a second actuating means to operatively engage the threads of the packing gland and energize or force downwardly and inwardly the ferrules 34 and 35 in fluidtight sealing engagement and subsequently exerting additional axial pressure on the tubing 10 so that its tapered lower end seats in the cooperating shoulder 16 of the body element 11.

I claim as my invention:

1. A small-diameter tubing connector and sealing apparatus for anchoring a small-diameter tubing in fluidtight flow communication with a body element having a recess therein in communication with a flow passage in said body element, said apparatus comprising
   a body element having a cylindrical shouldered recess therein at least twice the diameter of a tubing to be sealed therein to form an annular space around the tubing;
   a tubing axially extending into said recess to the bottom thereof;
   first sealing means between the end of said tubing in said recess and the surface of the body element at the bottom of the recess;
   second sealing means between said tubing and body elements in the annular space outside the lower end of the tubing;
   packing gland means having a tubing bore therethrough and being positioned in said annular space, one end of said packing gland means being engageable with said second sealing means and the other end extending outside said body element, said other end having an enlarged bore therein, said packing gland having a seating shoulder formed on the outer wall of said gland at its seated position in the body element;
   third sealing means formed between said packing gland means seating shoulder and a mating shoulder around the top of the body element recess;
   fourth sealing means positioned at the bottom of the enlarged bore of said packing gland means between said tubing and said packing gland means;
   first actuating means operatively engaging said packing gland means and said body element for energizing said second and third sealing means, and
   second actuating means operatively engaging said packing gland and said tubing for energizing said fourth and first sealing 2. The apparatus of claim 1 including a centrally-located shoulder in said body element at the bottom of said recess therein, and
   a cooperating seating shoulder on the end of said tubing in the recess to mate with the shoulder therein.

3. The apparatus of claim 2 wherein said second sealing means comprises a plurality of sealing rings positioned in the annular space around the lower portion of the tubing between the bottom of the recess and the bottom of the packing gland means.

4. The apparatus of claim 3 wherein the major height of the sealing rings are of a non-metallic, compressible and deformable material.

5. The apparatus of claim 4 including soft metal V-grooved packing rings positioned at either end of said second sealing means with the non-metallic sealing rings between them.

6. The apparatus of claim 1 wherein the first actuator means comprises cooperating screw threads carried on the outer surface of said packing gland means below the seating shoulder thereof and screw threads carried on the wall forming the upper portion of the recess below the seating shoulder at the open end of said recess.

7. The apparatus of claim 1 wherein the second actuator means comprises
   an energizer nut closing the enlarged bore around said tubing at the upper end of said packing gland means, and
   screw threads carried on one end of said energizer unit and adapted to cooperate with
   screw threads carried on the wall forming the enlarged bore in the packing gland means,
   said energizer nut having a threaded length sufficient for the end of the nut to engage said forth sealing means and compress it to a sealed position.

8. The apparatus of claim 7 wherein said forth sealing means comprises
   sealing metal ferrule means around the tubing and being actuable upon compression by said energizer nut to cut into and seal against the outer surface of the tubing and at its periphery to seal against the wall of the packing gland means.

9. The apparatus of claim 7 wherein a ferrule means seating shoulder is formed in the wall of said packing gland means at the point where the tubing bore is enlarged in diameter sufficiently to receive and seat therein said sealing metal ferrule means.

10. The apparatus of claim 1 wherein said first, third and fourth sealing means form metal-to-metal seals and wherein at least the major portion of said second sealing means is of a non-metallic composition.

11. A small-diameter tubing connector and sealing apparatus for anchoring a small-diameter tubing in fluid tight flow communication with a body element having a flow passage therein, said apparatus comprising in combination
    a body element having a fluid flow passage therein,
    said body element having a recess formed therein extending from the outer surface thereof to the fluid flow passage therein where the diameter of the recess at the fluid flow passage is substantially equal to the bore of a tubing to be positioned therein,
    said body element having a first seating shoulder axially formed at the bottom of said recess, said shoulder being of a size to receive a beveled end of a tubing thereon,
    said recess of said body element being larger in diameter above said seating shoulder and having a smooth-walled portion above the shoulder for receiving a stack of sealing means, and a threaded-walled portion for receiving the threaded end of a packing gland,
    a second seating shoulder formed around the large-diameter end of said recess for seating a packing gland thereon,
    a small-diameter tubing positioned axially within the recess of said body element and forming an annular space with the wall of said recess,
    a third shoulder formed at the end of the tubing at an angle to mate with the first seating shoulder at the end of said recess,
    a stack of packing means filling the recess outside the tubing above the seated end thereof,
    a packing gland having threads on the outer surface near one end thereof engaging the threaded-walled section of the recess, and a bore therethrough for passing said tubing through said gland,
    a fourth shoulder formed on the outer surface of said packing gland near the end of said threads to engage said second seating shoulder,
    said outwardly-extending end of the packing gland having an enlarged bore portion forming a ferrule-containing section,
    a ferrule seating shoulder formed at the bottom of the ferrule-containing section at the axial bore opening thereof,
    ferrule means positioned within said ferrule-containing section, and
    a ferrule energizer nut threadedly closing the top of the ferrule-containing section of the packing gland, the lower end of said energizer nut being in operative contact with said ferrule means for actuating and sealingly anchoring said ferrule means in gripping contact with the outer surface of said tubing.

* * * * *